United States Patent
Brisebois et al.

(10) Patent No.: US 9,635,494 B2
(45) Date of Patent: Apr. 25, 2017

(54) USER EQUIPMENT NEAR-FIELD COMMUNICATIONS GATING ACCORDING TO KINETIC SPEED DETECTION AND CELL VISITATION HISTORY

(71) Applicants: AT&T Mobility II LLC, Atlanta, GA (US); AT&T Intellectual Property I, L.P., Atlanta, GA (US)

(72) Inventors: Arthur Richard Brisebois, Cumming, GA (US); Zhi Cui, Sugar Hill, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/520,053

(22) Filed: Oct. 21, 2014

(65) Prior Publication Data

US 2016/0112826 A1  Apr. 21, 2016

(51) Int. Cl.
| | |
|---|---|
| *H04B 5/00* | (2006.01) |
| *H04W 4/00* | (2009.01) |
| *H04B 5/02* | (2006.01) |
| *H04W 8/00* | (2009.01) |
| *H04W 48/04* | (2009.01) |
| *H04W 4/02* | (2009.01) |

(52) U.S. Cl.
CPC .............. *H04W 4/008* (2013.01); *H04B 5/02* (2013.01); *H04W 8/005* (2013.01); *H04W 4/025* (2013.01); *H04W 48/04* (2013.01)

(58) Field of Classification Search
CPC ..... H04W 48/04; H04W 8/265; H04W 8/005; H04W 4/008; H04B 5/02
USPC .............................. 455/41.1, 41.2, 76, 552.1
See application file for complete search history.

(56) References Cited

U.S. PATENT DOCUMENTS

| | | | |
|---|---|---|---|
| 6,314,308 B1 | 11/2001 | Sheynblat et al. | |
| 6,430,168 B1 | 8/2002 | Djurkovic et al. | |
| 7,082,305 B2 | 7/2006 | Willars et al. | |
| 7,116,970 B2 | 10/2006 | Brusilovsky et al. | |

(Continued)

FOREIGN PATENT DOCUMENTS

| | | |
|---|---|---|
| EP | 2244503 | 10/2010 |
| EP | 2197228 | 12/2011 |

(Continued)

OTHER PUBLICATIONS

Feng, S. et al., "Self-Organizing Networks (SON) in 3GPP Long Term Evolution," Novel Mobile Radio Research, May 20, 2008.

(Continued)

*Primary Examiner* — Marceau Milord
(74) *Attorney, Agent, or Firm* — Hartman & Citrin LLC

(57) ABSTRACT

Concepts and technologies are described herein for user equipment ("UE") near-field communications ("NFC") gating according to kinetic speed detection and cell visitation history. According to one aspect disclosed herein, a mobile initiator device, such as a UE that includes an NFC hardware component, can determine a mobility state of the mobile initiator device. The mobile initiator device can control, based upon the mobility state, activation of a radio frequency field that is used to activate a passive NFC device. In this manner, detection of the passive NFC device and battery efficiency can each be maximized when appropriate.

17 Claims, 7 Drawing Sheets

(56) References Cited

U.S. PATENT DOCUMENTS

| | | | |
|---|---|---|---|
| 7,146,130 B2 | 12/2006 | Hsu et al. | |
| 7,400,600 B2 | 7/2008 | Mullany et al. | |
| 7,400,886 B2 | 7/2008 | Sahim et al. | |
| 7,440,755 B2 | 10/2008 | Balachandran | |
| 7,496,060 B2* | 2/2009 | Ramirez | H04W 88/06 370/311 |
| 7,508,781 B2* | 3/2009 | Liu | H04W 52/0216 370/311 |
| 7,590,422 B1 | 9/2009 | Chow et al. | |
| 7,653,392 B2 | 1/2010 | Ovadia et al. | |
| 7,680,469 B2* | 3/2010 | Fry | H04W 52/0232 455/127.1 |
| 7,924,787 B2 | 4/2011 | Lee | |
| 7,929,964 B2 | 4/2011 | Arumi et al. | |
| 7,936,708 B2 | 5/2011 | Kesavan et al. | |
| 8,121,090 B1 | 2/2012 | Dinan et al. | |
| 8,121,607 B2 | 2/2012 | Fang et al. | |
| 8,126,461 B2 | 2/2012 | Sengupta et al. | |
| 8,140,010 B2* | 3/2012 | Symons | H04B 5/0075 455/41.1 |
| 8,212,661 B2 | 7/2012 | Shuster | |
| 8,254,982 B2 | 8/2012 | Kuningas | |
| 8,270,975 B2 | 9/2012 | Kim et al. | |
| 8,270,991 B2 | 9/2012 | Zhao | |
| 8,271,025 B2 | 9/2012 | Brisebois et al. | |
| 8,279,831 B2 | 10/2012 | Sengupta et al. | |
| 8,280,377 B2 | 10/2012 | Lee et al. | |
| 8,331,228 B2 | 12/2012 | Huber et al. | |
| 8,331,929 B2 | 12/2012 | Brisebois et al. | |
| 8,364,156 B2 | 1/2013 | Chun et al. | |
| 8,385,917 B2 | 2/2013 | Brisebois | |
| 8,391,238 B2 | 3/2013 | Rune et al. | |
| 8,417,823 B2 | 4/2013 | Luna et al. | |
| 8,467,786 B2 | 6/2013 | Salkintzis | |
| 8,487,516 B2 | 7/2013 | Brisebois et al. | |
| 8,488,586 B2 | 7/2013 | Centonza et al. | |
| 8,489,020 B2* | 7/2013 | Bangs | H04B 5/0012 343/867 |
| 8,493,935 B2 | 7/2013 | Zisimopoulos | |
| 8,510,801 B2 | 8/2013 | Majmundar et al. | |
| 8,522,312 B2 | 8/2013 | Huber et al. | |
| 8,611,324 B2 | 12/2013 | Chhabra | |
| 8,693,949 B2* | 4/2014 | Royston | H04W 76/02 327/564 |
| 8,724,599 B2 | 5/2014 | Kim | |
| 8,787,830 B2 | 7/2014 | Moosavi et al. | |
| 8,803,474 B2* | 8/2014 | Hillan | G06K 7/0008 320/108 |
| 8,831,509 B2 | 9/2014 | Moosavi et al. | |
| 8,909,144 B2* | 12/2014 | Huomo | G06Q 20/045 455/41.1 |
| 8,965,279 B2* | 2/2015 | Lefley | G06K 7/0008 340/10.1 |
| 9,071,480 B2* | 6/2015 | Chen | H04L 25/03159 |
| 9,100,891 B2* | 8/2015 | Zheng | H04W 36/30 |
| 9,197,059 B2* | 11/2015 | Wilson | G05F 1/46 |
| 9,241,305 B2* | 1/2016 | Cui | H04W 48/18 |
| 2002/0123365 A1 | 9/2002 | Thorson et al. | |
| 2003/0078075 A1 | 4/2003 | Mcnicol | |
| 2003/0117953 A1 | 6/2003 | Kinahan et al. | |
| 2007/0091847 A1 | 4/2007 | Lee | |
| 2007/0184835 A1 | 8/2007 | Bitran et al. | |
| 2009/0068970 A1* | 3/2009 | Ahmed | H04W 48/16 455/161.1 |
| 2009/0088131 A1 | 4/2009 | Gholmieh et al. | |
| 2009/0088160 A1 | 4/2009 | Pani et al. | |
| 2009/0154423 A1 | 6/2009 | Song et al. | |
| 2009/0164813 A1 | 6/2009 | Tu et al. | |
| 2009/0209263 A1 | 8/2009 | Breuer et al. | |
| 2009/0221240 A1 | 9/2009 | Zhang | |
| 2009/0252137 A1 | 10/2009 | Bitran et al. | |
| 2010/0056181 A1 | 3/2010 | Rippon et al. | |
| 2010/0085947 A1 | 4/2010 | Ringland et al. | |
| 2010/0149971 A1 | 6/2010 | Noriega | |
| 2010/0178866 A1 | 7/2010 | Jalkanen | |
| 2010/0195632 A1 | 8/2010 | Prabhu | |
| 2010/0234021 A1 | 9/2010 | Ngai et al. | |
| 2010/0255849 A1 | 10/2010 | Ore | |
| 2010/0279601 A1 | 11/2010 | Phan et al. | |
| 2010/0296415 A1 | 11/2010 | Sachs et al. | |
| 2010/0296474 A1 | 11/2010 | Noriega | |
| 2011/0059694 A1 | 3/2011 | Audic | |
| 2011/0070863 A1* | 3/2011 | Ma | H04W 4/02 455/410 |
| 2011/0072101 A1 | 3/2011 | Forssell et al. | |
| 2011/0075557 A1 | 3/2011 | Chowdhury et al. | |
| 2011/0142006 A1 | 6/2011 | Sachs | |
| 2011/0149879 A1 | 6/2011 | Noriega et al. | |
| 2011/0235615 A1 | 9/2011 | Kalhan | |
| 2011/0254687 A1* | 10/2011 | Arponen | H04M 1/72525 340/540 |
| 2011/0261695 A1 | 10/2011 | Zhao et al. | |
| 2011/0291834 A1* | 12/2011 | Boldyrev | G06F 12/1416 340/572.1 |
| 2011/0306386 A1 | 12/2011 | Centoza et al. | |
| 2012/0013504 A1* | 1/2012 | Raento | H04M 1/72572 342/357.29 |
| 2012/0021725 A1 | 1/2012 | Rune | |
| 2012/0040608 A1* | 2/2012 | Walker | H04W 52/0258 455/13.2 |
| 2012/0057493 A1 | 3/2012 | Omori | |
| 2012/0108252 A1 | 5/2012 | Dimou et al. | |
| 2012/0188992 A1 | 7/2012 | Kim et al. | |
| 2012/0258674 A1 | 10/2012 | Livet et al. | |
| 2012/0258715 A1 | 10/2012 | Souissi et al. | |
| 2012/0264412 A1 | 10/2012 | Tervonen et al. | |
| 2012/0275371 A1 | 11/2012 | Somasundaram et al. | |
| 2012/0294293 A1 | 11/2012 | Kahn et al. | |
| 2012/0315905 A1 | 12/2012 | Zhu et al. | |
| 2012/0324100 A1 | 12/2012 | Tomici et al. | |
| 2013/0012182 A1 | 1/2013 | Liao | |
| 2013/0023302 A1 | 1/2013 | Sivanesan et al. | |
| 2013/0029708 A1 | 1/2013 | Fox et al. | |
| 2013/0045740 A1 | 2/2013 | Gayde et al. | |
| 2013/0051379 A1 | 2/2013 | Wang et al. | |
| 2013/0065562 A1 | 3/2013 | Singh | |
| 2013/0065585 A1 | 3/2013 | Pelletier et al. | |
| 2013/0111038 A1 | 5/2013 | Girard | |
| 2013/0121322 A1 | 5/2013 | Salkintzis | |
| 2013/0143526 A1 | 6/2013 | Kanugovi et al. | |
| 2013/0143542 A1 | 6/2013 | Kovvali et al. | |
| 2013/0150079 A1 | 6/2013 | Krasner | |
| 2013/0165131 A1 | 6/2013 | Garcia Martin et al. | |
| 2013/0170351 A1 | 7/2013 | Reznik et al. | |
| 2013/0189996 A1 | 7/2013 | Sridhar et al. | |
| 2013/0208696 A1 | 8/2013 | Garcia Martin et al. | |
| 2013/0217326 A1* | 8/2013 | Symons | H02J 7/025 455/41.1 |
| 2013/0230011 A1 | 9/2013 | Rinne et al. | |
| 2013/0303194 A1 | 11/2013 | Rowles | |
| 2013/0308445 A1 | 11/2013 | Xiang et al. | |
| 2014/0120990 A1* | 5/2014 | Parco | H04W 52/028 455/574 |
| 2014/0200002 A1 | 7/2014 | Vangala et al. | |
| 2014/0357293 A1* | 12/2014 | Tsaur | H04W 64/00 455/456.1 |
| 2015/0024743 A1* | 1/2015 | Zheng | H04W 48/16 455/434 |
| 2015/0135336 A1* | 5/2015 | Arasavelli | H04L 63/10 726/29 |
| 2015/0156783 A1 | 6/2015 | Klang et al. | |

FOREIGN PATENT DOCUMENTS

| | | |
|---|---|---|
| EP | 2533571 | 12/2012 |
| EP | 2632072 | 8/2013 |
| EP | 2603046 | 12/2013 |
| WO | WO2012121757 | 9/2012 |
| WO | WO2012149954 | 11/2012 |
| WO | WO2012168152 | 12/2012 |
| WO | WO2013127691 | 9/2013 |

(56) References Cited

FOREIGN PATENT DOCUMENTS

OTHER PUBLICATIONS

Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/ Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.
S.P. Beeby, et al., "Kinetic Energy Harvesting," ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered," http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884, 896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026; http://www.3gpp.org/ftp/Spec/html-info/TDocExMtg--R3-73--28511.htm.
Stemm, Mark, and Randy H. Katz, "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni, "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim, "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P., "Trends in handover design." Communications Magazine, IEEE 34.3 (1996): 82-90. http://inrg.csie.ntu.edu.tw/course/wms/paper/Pollin96.pdf.
U.S. Office Action dated Jun. 27, 2012 in U.S. Appl. No. 12/946,611.
U.S. Office Action dated Mar. 22, 2012 in U.S. Appl. No. 12/946,611.
U.S. Notice of Allowance dated Nov. 2, 2012 in U.S. Appl. No. 12/946,611.
U.S. Office Action dated Mar. 13, 2012 in U.S. Appl. No. 12/624,643.
U.S. Notice of Allowance dated Aug. 8, 2012 in U.S. Appl. No. 12/624,643.
U.S. Office Action dated Sep. 13, 2013 in U.S. Appl. No. 13/681,141.
U.S. Office Action dated Apr. 22, 2013 in U.S. Appl. No. 13/681,141.
U.S. Office Action dated Apr. 7, 2014 in U.S. Appl. No. 13/681,141.
U.S. Office Action dated Oct. 23, 2014 in U.S. Appl. No. 13/748,454.
U.S. Office Action dated Aug. 18, 2015 in U.S. Appl. No. 13/681,141.
U.S. Office Action dated Apr. 17, 2015 in U.S. Appl. No. 13/681,141.
U.S. Office Action dated Jan. 11, 2016 in U.S. Appl. No. 13/681,141.
U.S. Appl. No. 14/724,201, filed May 28, 2015.
U.S. Notice of Allowance dated Apr. 13, 2016 in U.S. Appl. No. 13/681,141.
U.S. Office Action dated May 3, 2016 in U.S. Appl. No. 14/724,201.
U.S. Office Action dated Aug. 12, 2016 in U.S. Appl. No. 14/724,201.
U.S. Office Action dated Aug. 25, 2016 in U.S. Appl. No. 14/797,255.
U.S. Office Action dated Jan. 17, 2017 in U.S. Appl. No. 14/724,201.
U.S. Office Action dated Dec. 16, 2016 in U.S. Appl. No. 14/797,255.

\* cited by examiner

000# USER EQUIPMENT NEAR-FIELD COMMUNICATIONS GATING ACCORDING TO KINETIC SPEED DETECTION AND CELL VISITATION HISTORY

BACKGROUND

Near-field communications ("NFC") is a short-range wireless technology that allows detection and communication between powered active "initiator" devices and non-powered passive "target" devices. A passive target device is typically a very small sticker with no connected power source. Passive target devices receive power from a radio frequency ("RF") field from an initiator device. Upon receipt of an RF field, the passive target device establishes a transponder relationship with the initiator device, and the passive target device can transmit information to the initiator device.

One of the benefits of NFC is also a limiting attribute. NFC target devices are able to obtain power from other devices. Because NFC target devices are not powered, NFC target devices can be small, simplistic in architecture, and can therefore be placed upon just about any object. Unfortunately, NFC target devices are unable to transmit information, reveal proximity, or otherwise be known by nearby initiator devices that are not transmitting an RF field. Mobile initiator devices, such as NFC-enabled smartphones, typically have limited battery power, and for this reason, cannot transmit an RF field continuously. Mobile initiator devices therefore activate an RF field only when manually selected by a user. For example, a user may select an NFC activation button on a peer-to-peer application to activate the RF field.

SUMMARY

Concepts and technologies are described herein for user equipment ("UE") NFC gating according to kinetic speed detection and cell visitation history. UE NFC gating according to kinetic speed detection and visitation history is a power-efficient mechanism by which initiator mobile devices can automatically activate a field that can power one or more passive target devices, and thus create a transponder pair. Radio frequency ("RF") field activation and deactivation can be controlled according to changes in mobility state, such as a mobility state detected by a kinetic generator.

According to one aspect disclosed herein, a mobile initiator device, such as a UE that includes an NFC hardware component, can determine a mobility state of the mobile initiator device. The mobile initiator device can control, based upon the mobility state, activation of an RF field that is used to activate a passive NFC device.

In some embodiments, the mobile initiator device can determine the mobility state of the mobile initiator device to be a pedestrian mobility state. In these embodiments, the mobile initiator device can control, based upon the pedestrian mobility state, activation of the RF field that is used to activate the passive NFC device so that the activation of the RF field is in accordance with an RF field duty cycle designed to maximize detection success of the passive near-field communications device.

In some embodiments, the mobile initiator device can determine the mobility state of the mobile initiator device to be a vehicular mobility state. In these embodiments, the mobile initiator device can control, based upon the vehicular mobility state, activation of the RF field that is used to activate the passive NFC device so that the activation of the RF field is in accordance with an RF field duty cycle designed to maximize battery efficiency of the mobile initiator device.

In some embodiments, the mobile initiator device can determine the mobility state of the mobile initiator device to be a stationary mobility state. In these embodiments, the mobile initiator device can control, based upon the vehicular mobility state, activation of the RF field that is used to activate the passive NFC device so that the activation of the RF field is in accordance with an RF field duty cycle designed to maximize battery efficiency of the mobile initiator device.

In some embodiments, the mobile initiator device can determine a change from the mobility state to a new mobility state. In response to detecting the change from the mobility state to the new mobility state, the mobile initiator device can activate the RF field for a specified time.

In some embodiments, the mobile initiator device can receive a response from the passive near-field communications device. The mobile initiator device can record a physical cell identifier ("PCI") of a cell site upon which the mobile initiator device is camping. The mobile initiator device also can associate the PCI with the passive NFC device in a cell visitation history storage.

In some embodiments, the mobile initiator device can determine a cell site upon which the mobile initiator device is camping. The mobile initiator device can determine whether one or more passive NFC devices are available in the cell site upon which the mobile initiator device is camping. In response to determining that one or more passive NFC devices are available in the cell site upon which the mobile initiator device is camping, the mobile initiator device can activate the RF field in accordance with an RF field duty cycle designed to maximize detection success of the passive near-field communications device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
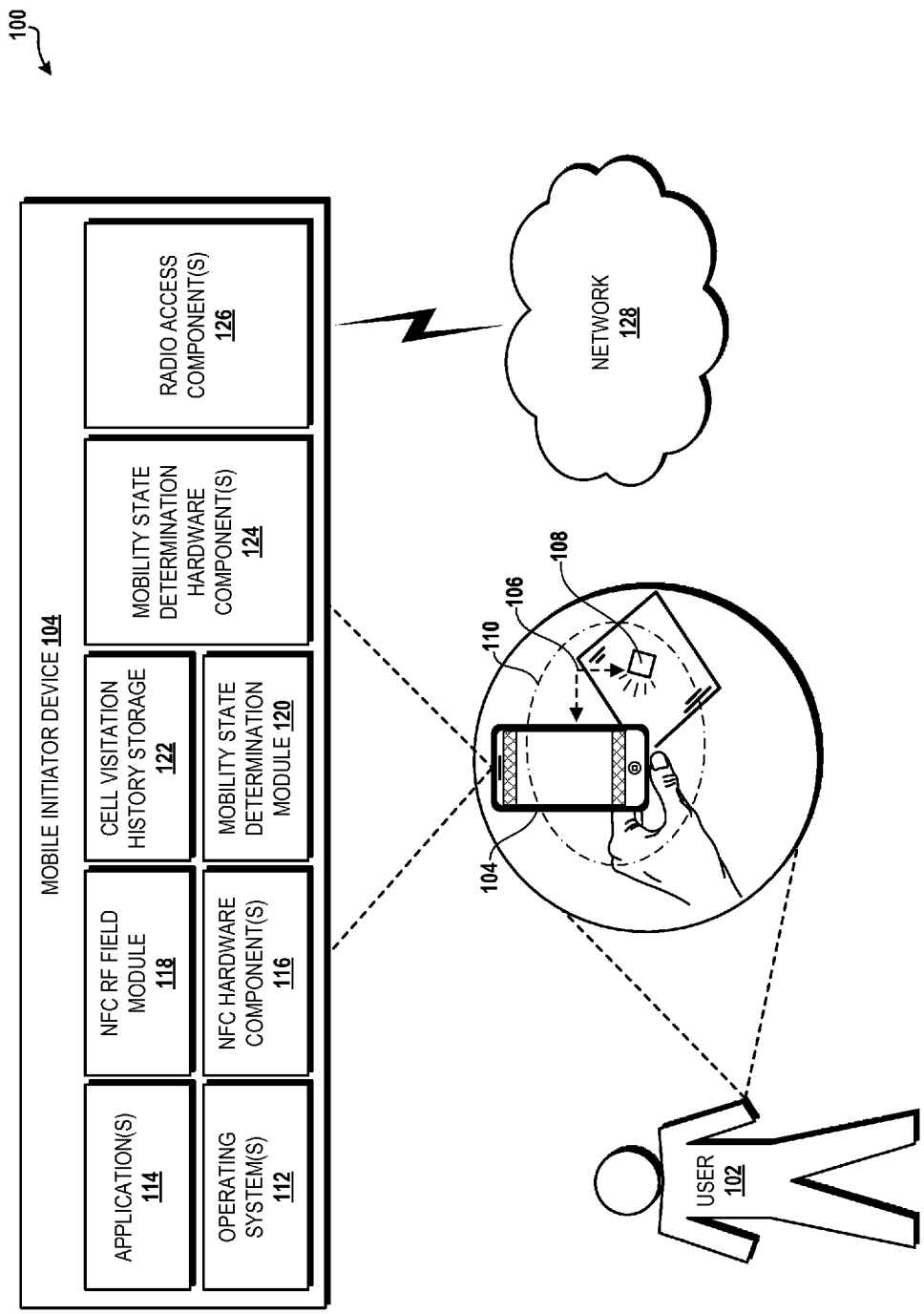
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The illustrated operating environment 100 includes a user 102 who is associated with a mobile initiator device 104 that is capable of establishing a connection 106, via near-field communications ("NFC"), with a passive target device (hereinafter "target device") 108 in response to the target device 108 receiving power from a radio frequency ("RF") field 110 generated by the mobile initiator device 104. Upon receipt of the RF field 110, the target device 108 establishes a transponder relationship with the mobile initiator device 104, and the target device 108 can transmit information to the mobile initiator device 104 via the connection 106.

The mobile initiator device 104 can be a cellular telephone, a feature phone, a smartphone, a mobile computing device, a portable television, a portable video game console, other computing device, or other user equipment ("UE"). The illustrated mobile initiator device 104 includes one or more operating systems 112, one or more applications 114, one or more NFC hardware components 116, an NFC RF field module 118, a mobility state determination module 120, a cell visitation history storage 122, one or more mobility state determination hardware components 124, and one or more radio access components 126.

The operating system(s) 112 can include one or more programs for controlling the operation of the mobile initiator device 104. The operating system(s) 112 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The application(s) 114 can execute on top of the operating system(s) 112. The application(s) 114 can include, for example, one or more presence applications, one or more visual voice mail applications, one or more messaging applications, one or more text-to-speech and/or speech-to-text applications, one or more add-ons, one or more plug-ins, one or more email applications, one or more music applications, one or more video applications, one or more camera applications, one or more location-based service applications, one or more power conservation applications, one or more game applications, one or more productivity applications, one or more entertainment applications, one or more enterprise applications, combinations thereof, and the like.

The NFC hardware component(s) 116 can include one or more devices that support NFC-compatible air-interface protocols, standards, and specifications. For example, the NFC hardware component(s) 116 can include one or more transceiver devices each capable of generating the RF field 110 at a designated operating frequency, such as 13.56 megahertz ("MHz"). The NFC hardware component(s) 116 also can include one or more antennas, one or more microcontrollers, one or more memory components, and/or the like. Moreover, the NFC hardware component(s) 116 can be built-in to the mobile initiator device 104 and/or in communication with the mobile initiator device 104 via BLUETOOTH, other RF, a wired connection, and/or the like as an add-on component to the mobile initiator device 104.

The NFC RF field module 118 can include computer-readable instructions that can be executed by one or more of the NFC hardware component(s) 116 (e.g., a microcontroller) and/or can be executed by one or more processors (best shown in FIG. 5) of the mobile initiator device 104 to cause the NFC hardware component(s) 116 to activate and deactivate the RF field 110 according to duty cycle criteria, which can include an absolute mobility state of the mobile initiator device 104, a mobility state change, and/or a cell visitation history as will be described in greater detail below. The NFC RF field module 118 can be embedded in the NFC hardware component(s) 116 and/or can be stored in a memory (best shown in FIG. 5) of the mobile initiator device 104 and made accessible to the NFC hardware component(s) 116.

The NFC RF field module 118 can cause the NFC hardware component(s) 116 to automatically activate the RF field 110 when NFC detection and data exchange are likely to be utilized. The NFC RF field module 118 also can cause the NFC hardware component(s) 116 to automatically deactivate the RF field 110 for battery conservation when NFC detection and data exchange are less likely to be utilized. The determination of whether or not NFC should be utilized can be based upon the absolute mobility state of the mobile initiator device 104, changes in the mobility state, and/or cell visitation history. Whether or not NFC detection and data exchange should be utilized is rarely 100% predictable. For this reason, the RF field 110 can be cycled on and off according to a battery-efficient duty cycle (also referred to herein as a "gating pattern"). The gating pattern can provide a balance between detection success and battery efficiency.

NFC communications are low-powered and typically only useful within a relatively short range (e.g., few feet) between the initiator and target devices—the mobile initiator device 104 and the target device 108, respectively, in the illustrated example. NFC communications between mobile initiator and target devices are therefore unreliable or relatively short-lived if relative mobility speed is high. Battery-powered NFC communications are therefore useful only when the mobile initiator and target devices are relatively stationary. For this reason, a highly mobile initiator device (e.g., the user 102 driving or riding in a vehicle with the mobile initiator device 104—hereinafter "vehicular mobility state") can conserve battery by activating the RF field 110 infrequently and for a relatively short hold time. The probability of useful NFC communication is higher if the user 102 is walking with the mobile initiator device 104 (hereinafter "pedestrian mobility state"). In the pedestrian mobility state, the RF field 110 should be active most of the time in order for the mobile initiator device 104 to detect and communicate with nearby target devices such as the target device 108. If the mobility state is "stationary" (e.g., the user 102 has placed the mobile initiator device 104 on a desk or other surface or the mobile initiator device 104 is in a pocket while the user 102 is seated), then the likelihood of new NFC target devices is low. In this case, the stationary initiator device can conserve battery by activating the RF field 110 infrequently and for a relatively short hold time. In these examples, the RF field duty cycles can be adapted as follows:

Vehicular=driving: Low RF field duty cycle=high battery efficiency;

Pedestrian=walking: High RF field duty cycle=high detection success;

Stationary=sitting: Low RF field duty cycle=high battery efficiency.

The mobility state—vehicular, pedestrian, or stationary, for example—can be determined by the mobile initiator device 104 via execution, via one or more processors, of instructions included in the mobility state determination module 120 based upon output provided by the mobility state determination hardware component(s) 124. The mobility state determination module 120 can be programmed to define the RF field duty cycles for one or more mobility states. The mobility state determination module 120 can receive output from the mobility state determination hardware component(s) 124 and can determine, based at least in part upon the output, the RF field duty cycle to employ for the mobility state associated with the received output.

The mobility state determination module 120 also can detect changes in the mobility state of the mobile initiator device 104. In response to detecting a change, the mobility state determination module 120 can instruct the NFC RF field module 118 to cause the NFC hardware component(s) 116 to activate the RF field 110 for a specified time to detect nearby NFC devices, such as the target device 108.

The mobile initiator device 104 is configured to connect to and communicate, via one or more of the radio access components 126, with a network 128 for voice and/or data communications between the mobile initiator device 104 and one or more other mobile devices, computers, servers, networking devices, and/or other networks (not shown). The network 128 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. The network 128 can include one or more radio access networks ("RANs"). A RAN can utilize various channel access methods (which may or may not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile initiator device 104. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The network 128 can include a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the radio access component(s) 126 of mobile initiator device 104. Moreover, a mobile telecommunications network can provide a connection to an internet or other WAN so that the mobile initiator device 104 can access internet content such as websites, streaming media, online video games, downloadable content, and the like.

A RAN operating within or as part of the network 128 can include one or more cells. As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile initiator device 104, can connect to the network 128. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from the network 128.

The mobile initiator device 104 can camp on and monitor cellular sites while in an idle mode, thus allowing call setup and incoming call page detection. Each cell site sector carrier has a unique identifier referred to herein as a physical cell identifier ("PCI"), which is broadcast by the cell site and detected by the mobile initiator device 104 while in active or idle mode within the associated service area. When the mobile initiator device 104 activates the RF field 110, the mobile initiator device 104 may or may not receive a response from nearby NFC devices, such as the target device 108. Each time the mobile initiator device 104 does receive a response from one or more nearby NFC target devices, the mobile initiator device 104 can record the pertinent PCI of the camping cell site in the cell visitation history storage 122. Over time, the cell visitation history includes which PCIs do and do not have one or more overlaid NFC devices. The cell visitation history can be used to further optimize the RF field activation. For example, the mobile initiator device 104 can use a higher RF field duty cycle and improve detection probability and time when camping on cells with a history of NFC device detection. The mobile initiator device 104 can reduce RF field duty cycle and conserve battery when camping on cells with no history of NFC device detection.

Although the aspects disclosed herein are described with specific reference to NFC technology, other wireless communications technologies such as, but not limited to, BLUETOOTH, BLUETOOTH LOW ENERGY ("LE"), ZIGBEE, other RF, infrared, infrared data association ("IRDA"), other short-range wireless communication technologies, and the like can be controlled, at least in part, according to kinetic speed detection and/or cell visitation history. As such, the use of NFC technology herein should not be construed as being limiting.

Figure 2A:
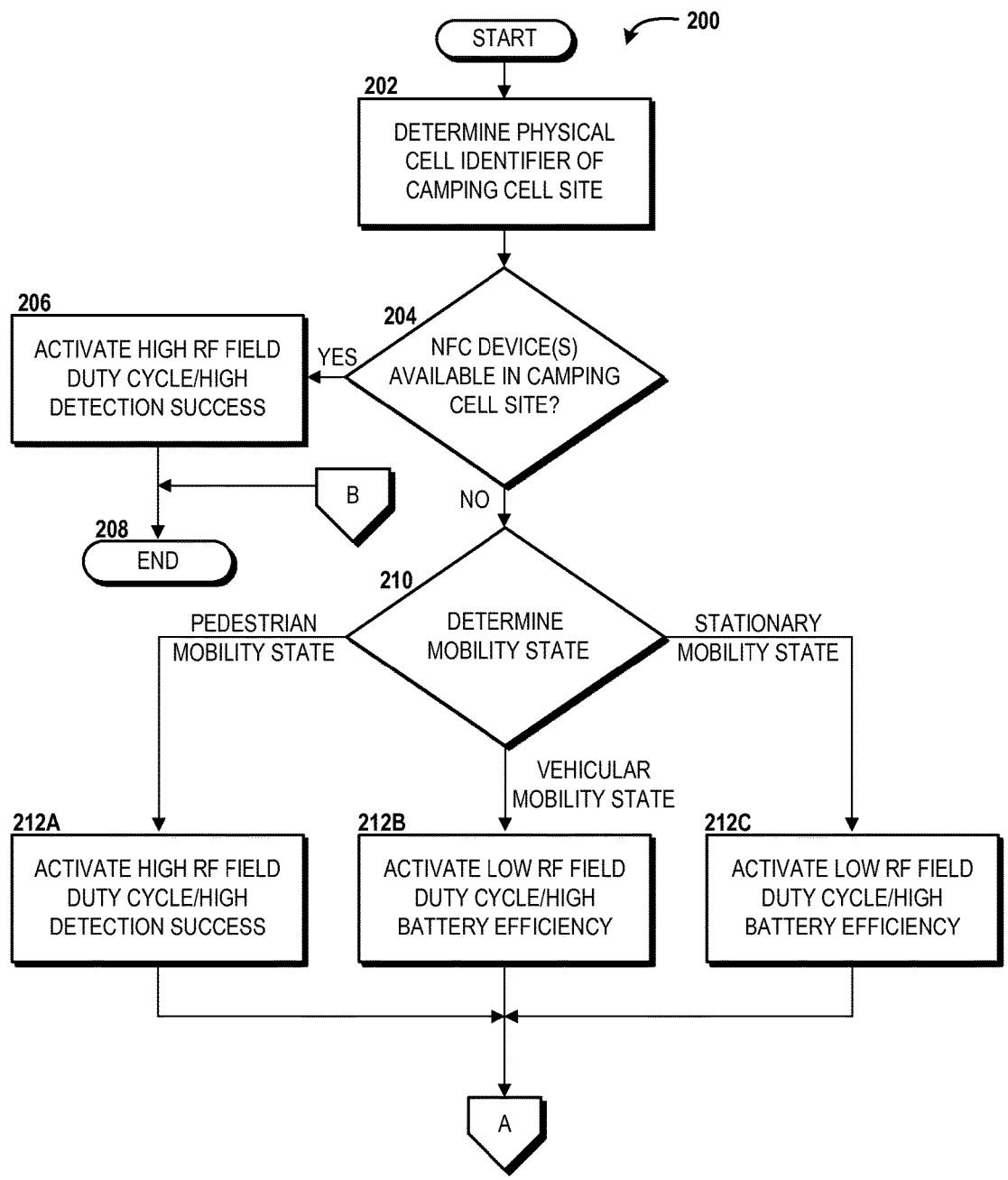
FIGS. 2A-2B are a flow diagram illustrating aspects of a method for user equipment ("UE") near-field communications ("NFC") gating according to kinetic speed detection and cell visitation history, according to an illustrative embodiment.
Figure 2B:
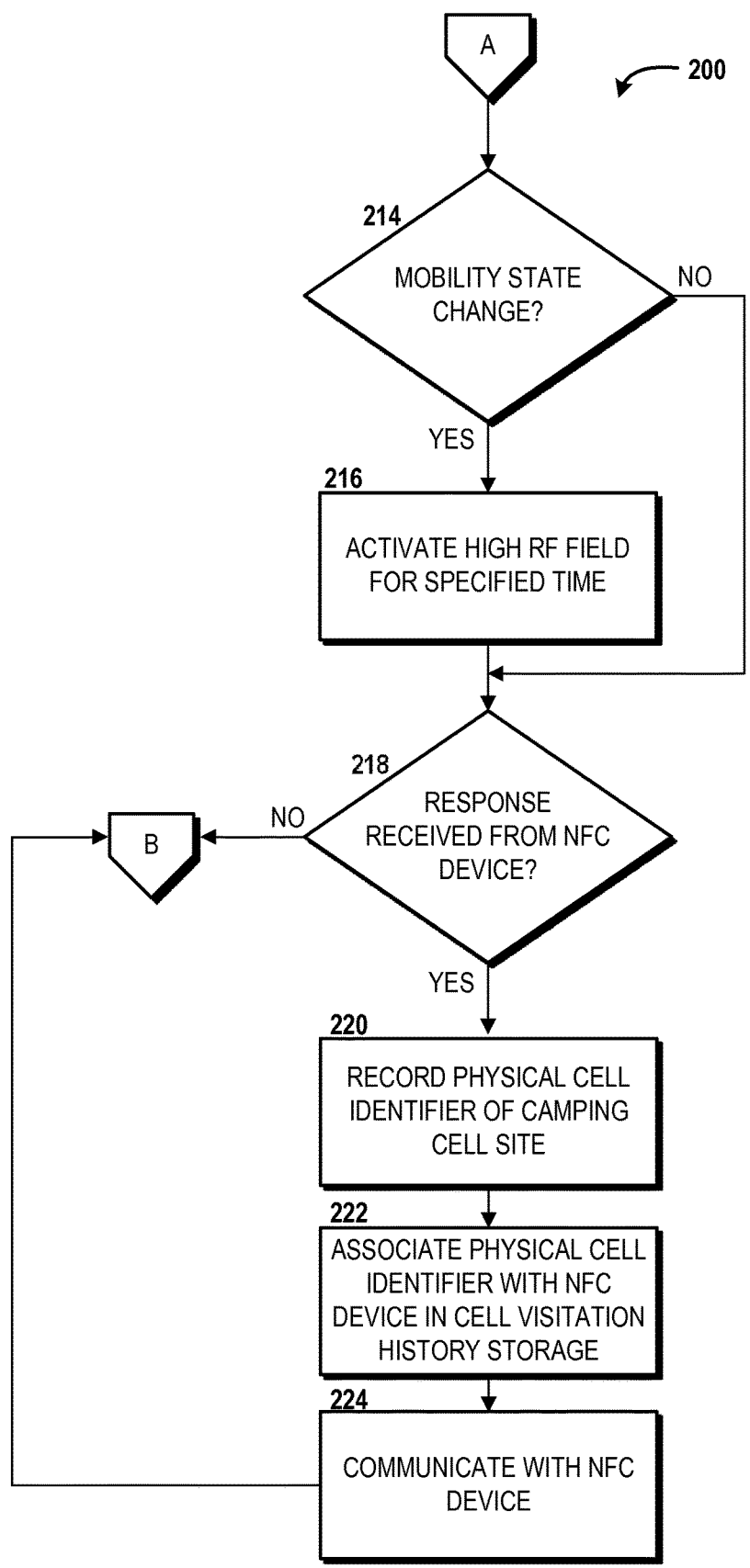

Turning now to FIGS. 2A-2B, a flow diagram illustrating aspects of a method 200 for UE NFC gating according to kinetic speed detection and cell visitation history will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 is described from the perspective of the mobile initiator device 104. As such, the method 200 is described with additional reference to FIG. 1. The method 200 begins and proceeds to operation 202, where the mobile initiator device 104 determines the PCI of the cell site upon which the mobile initiator device 104 is camping. From operation 202, the method 200 proceeds to operation 204, where the mobile initiator device 104 determines if one or more NFC devices, such as the target device 108, is/are available in the camping cell site identified at operation 202. If the mobile initiator device 104 determines, at operation 204, that one or more NFC devices are available in the camping cell site, then the method 200 proceeds to operation 206, where the mobile initiator device 104 causes, via execution of the NFC RF field module 118, the NFC hardware component 116 to activate the RF field 110 according to a high RF field duty cycle that is capable of a high detection success of one or more NFC devices available in the camping cell site. From operation 206, the method 200 proceeds to operation 208, where the method 200 may end.

If, however, the mobile initiator device 104 determines, at operation 204, that one or more NFC devices are not available in the camping cell site, then the method 200 proceeds to operation 210. At operation 210, the mobile initiator device 104 determines a mobility state of the mobile initiator device 104 via execution of the mobility state determination module 120 and output from the mobility state determination hardware component(s) 124. In the illustrated example, the mobile initiator device 104 can determine that the mobility state of the mobile initiator device 104 is a pedestrian mobility state, a vehicular mobility state, or a stationary mobility state. It should be understood, however, that greater or fewer mobility states and/or different mobility states may be utilized. As such, the illustrated mobility states should not be construed as being limiting in any way.

If, at operation 210, the mobile initiator device 104 determines that the mobility state is a pedestrian mobility state, the method 200 proceeds to operation 212A, where the mobile initiator device 104 causes the NFC RF field module 118 to instruct the NFC hardware component(s) 116 to activate the RF field 110 in a high RF field duty cycle that facilitates a high detection success of one or more NFC devices, such as the target device 108. In the pedestrian mobility state, the RF field 110 should be active most of the time in order for the mobile initiator device 104 to detect and communicate with nearby target devices such as the target device 108.

If, at operation 210, the mobile initiator device 104 determines that the mobility state is a vehicular mobility state, the method 200 proceeds to operation 212B, where the mobile initiator device 104 causes the NFC RF field module 118 to instruct the NFC hardware component(s) 116 to activate the RF field 110 in a low RF field duty cycle that facilitates a high battery efficiency for the mobile initiator device 104. In the vehicular mobility state, the RF field 110 should not be active most of the time in order for the mobile initiator device 104 to conserve battery resources.

If, at operation 210, the mobile initiator device 104 determines that the mobility state is a stationary mobility state, the method 200 proceeds to operation 212C, where the mobile initiator device 104 causes the NFC RF field module 118 to instruct the NFC hardware component(s) 116 to activate the RF field 110 in a low RF field duty cycle that facilitates a high battery efficiency for the mobile initiator device 104. In the stationary mobility state, the RF field 110 should not be active most of the time in order for the mobile initiator device 104 to conserve battery resources.

From operation 212A, operation 212B, or operation 212C, the method 200 proceeds to operation 214 (shown in FIG. 2B). At operation 214, the mobile initiator device 104 determines if the mobility state has changed. If the mobile initiator device 104 determines that the mobility state has changed, the method 200 proceeds to operation 216, where the mobile initiator device 104 causes the NFC RF field module 118 to instruct the NFC hardware component(s) 116 to activate, for a specified time, the RF field 110 in a high RF field duty cycle that facilitates a high detection success of one or more NFC devices, such as the target device 108.

From operation 216, or if the mobile initiator device 104 determines, at operation 214, that the mobility state has not changed, the method 200 proceeds to operation 218, where the mobile initiator device 104 determines whether a response has been received from an NFC device, such as the target device 108. If the mobile initiator device 104 determines that a response has been received from an NFC device, the method 200 proceeds to operation 220, where the mobile initiator device 104 records the PCI of the cell site upon which the mobile initiator device 104 is camping. From operation 220, the method 200 proceeds to operation 222, where the mobile initiator device 104 associates the PCI with the NFC device in the cell visitation history storage 122. If, however, the mobile initiator device 104 determines, at operation 218, that a response has not been received from an NFC device, the method 200 proceeds to operation 208, where the method 200 may end.

From operation 222, the method 200 proceeds to operation 224, where the mobile initiator device 104 communicates, via the NFC hardware component(s) 116, with the NFC device. During this communication, the mobile initiator device 104 can provide data to and/or receive data from the NFC device. The data exchanged can be any data. The data may be associated with the operating system(s) 112 and/or the application(s) 114, and/or any other aspect of the operation of the mobile initiator device 104, an external device (not shown), the network 128, and/or the user 102. As such, the data exchanged between the mobile initiator device 104 and the NFC device should not be construed as being limiting in any way. From operation 224, the method 200 proceeds to operation 208, where the method 200 may end.

Figure 3:
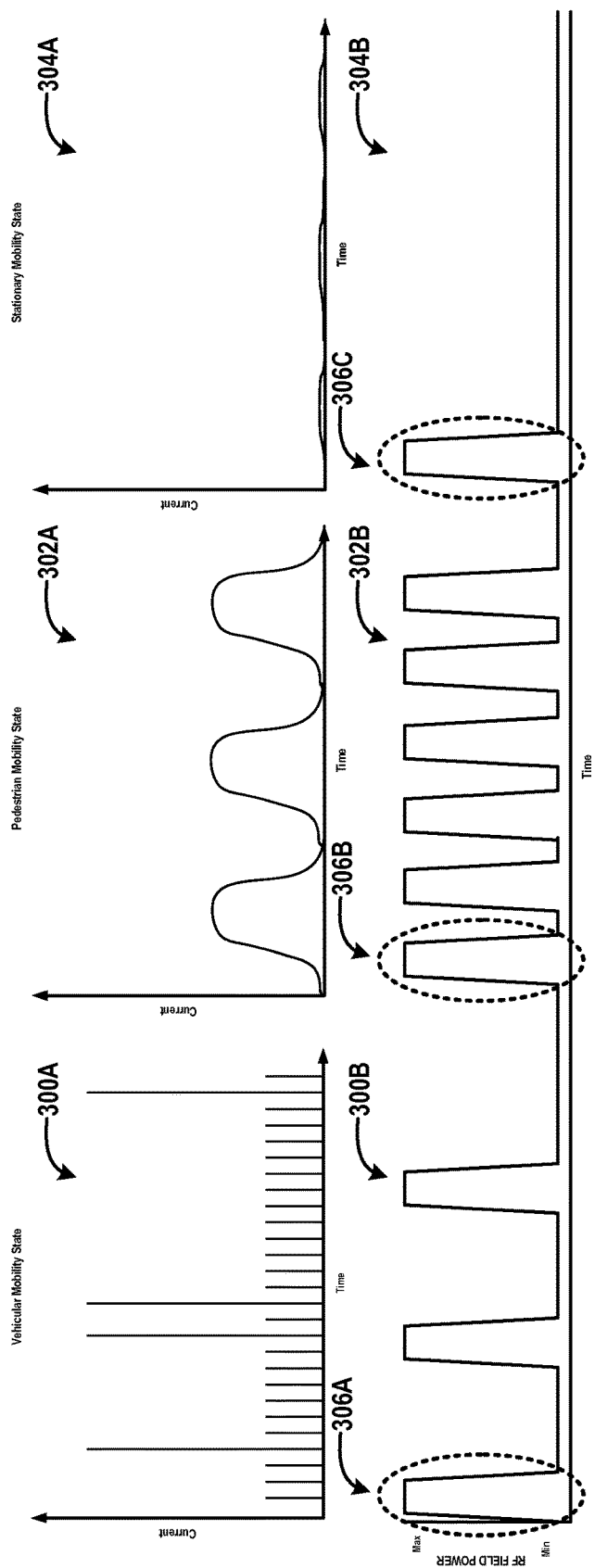
FIG. 3 is a diagram illustrating aspects of example gating patterns for various mobility states, according to an illustrative embodiment.

Turning now to FIG. 3, a diagram illustrating aspects of example gating patterns for various mobility states will be described, according to an illustrative embodiment. In particular, a first graph 300A, a second graph 302A, and a third graph 304A each show time on the X-axis and current on the Y-axis.

The first graph 300A is associated with a vehicular mobility state that causes the NFC RF field module 118 to instruct the NFC hardware component(s) 116 to activate the RF field 110 in accordance with a low RF field duty cycle 300B. The second graph 302A is associated with a pedestrian mobility state that causes the NFC RF field module 118 to instruct the NFC hardware component(s) 116 to activate the RF field 110 in accordance with a high RF field duty cycle 302B. The third graph 304A is associated with a stationary mobility state that causes the NFC RF field module 118 to instruct the NFC hardware component(s) 116 to activate the RF field 110 in accordance with another low RF field duty cycle 304B.

Also shown in FIG. 3 are mobility state changes 306A-306C. The mobility state change 306A shows when the mobility state of the mobile initiator device 104 changes to the vehicular mobility state. The mobility state change 306B shows when the mobility state of the mobile initiator device 104 changes from the vehicular mobility state to the pedestrian mobility state. The mobility state change 306C shows when the mobility state of the mobile initiator device 104 changes from the pedestrian mobility state to the stationary mobility state. The aspects illustrated in FIG. 3 are merely illustrative, and should not be construed as being limiting in any way.

Figure 4:
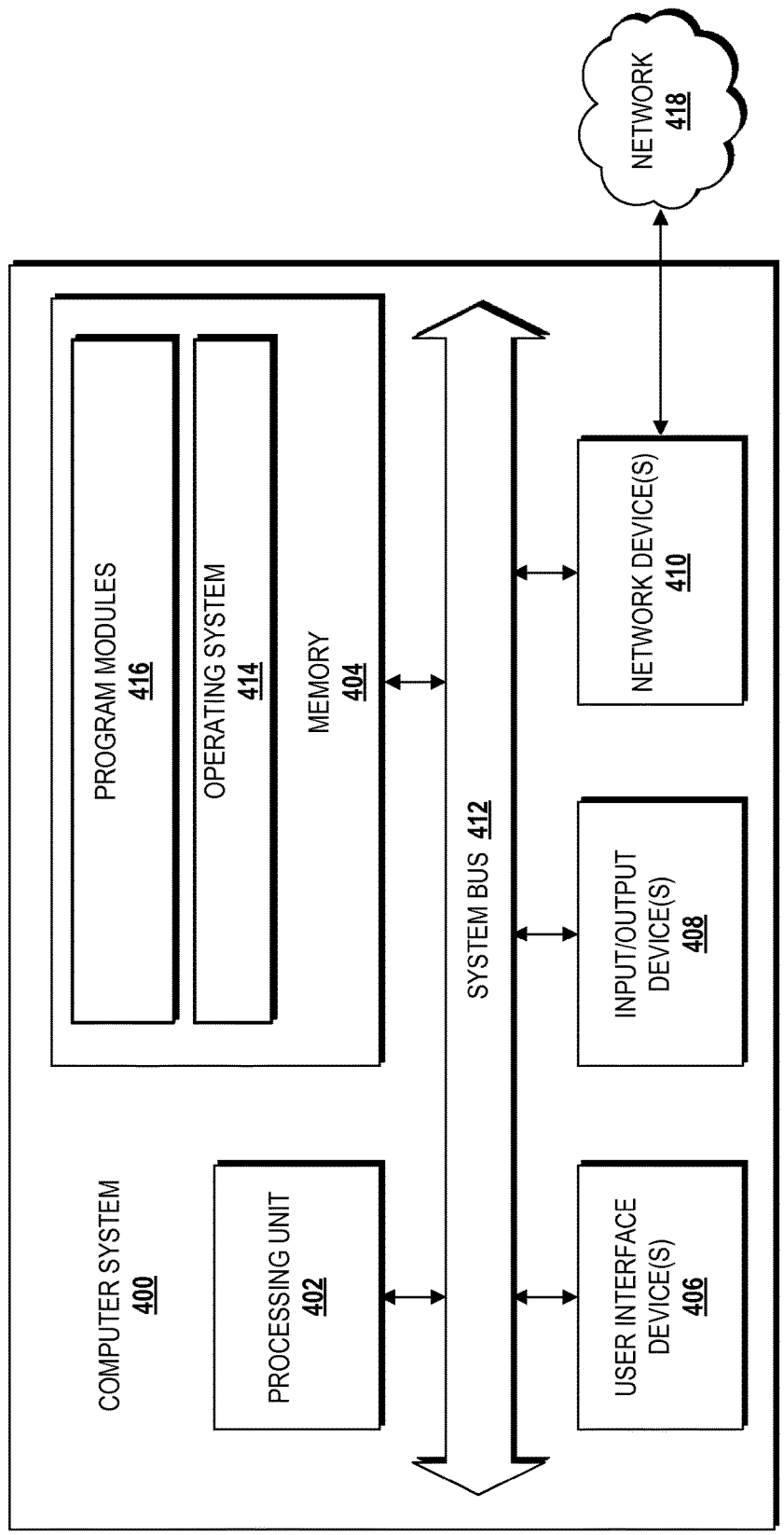
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. In some implementations, the mobile initiator device 104 can utilize an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 414 (e.g., the operating system(s) 112) and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 can include the application(s) 114, the NFC RF field module 118, and/or the mobility state determination module 120 in embodiments that the mobile initiator device 104 is configured like the computer system 400. The program modules 416 and/or other programs can be embodied in computer-readable media containing instructions that, when executed by the processing unit 402, perform the method 200 or at least a portion thereof, described in detail above with respect to FIGS. 2A-2B. According to embodiments, the program modules 416 may be embodied in hardware, software, firmware, or any combination thereof. Although not shown in FIG. 4, it should be understood that the memory 404, in embodiments that the mobile initiator device 104 is configured like the computer system 400, also can be configured to store the cell visitation history storage 122, and/or other data.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418, which can include, for example, the network 128. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 418 may be a wired network such as, but not limited to, a wide area network ("WAN"), a wired LAN such as provided via Ethernet, a wired personal area network n ("PAN"), or a wired metropolitan area network ("MAN").

Figure 5:
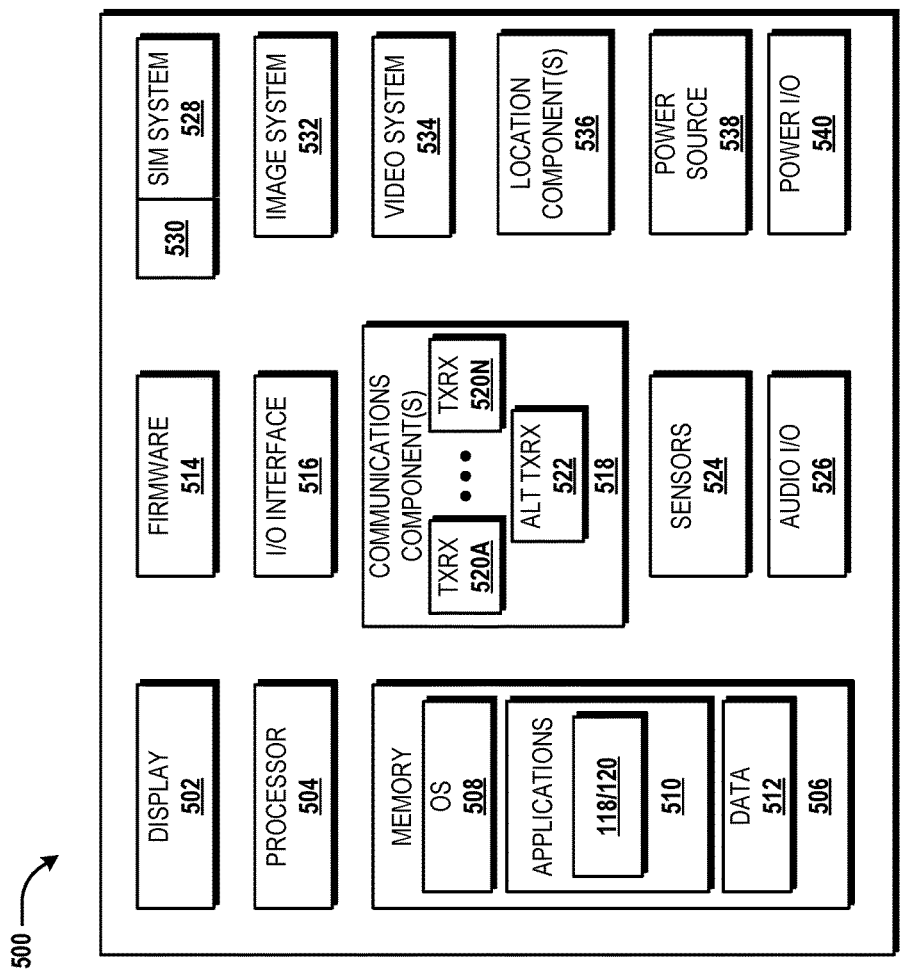
FIG. 5 is a block diagram illustrating an example mobile device capable of implementing aspects of the embodiments disclosed herein.

Turning now to FIG. 5, an illustrative mobile device 500 and components thereof will be described. In some embodiments, the mobile initiator device 104 described above with reference to FIG. 1 can be configured as and/or can have an architecture similar or identical to the mobile device 500 described herein in FIG. 5. It should be understood, however, that the mobile initiator device 104 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508 (e.g., the operating system(s) 112), one or more applications 510 (e.g., the application(s) 114, the NFC RF field module 118, and/or the mobility state determination module 120), other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, the cell visitation history storage 122 and/or other data, if desired.

According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described above herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA, CDMAONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, IRDA, NFC, other RF technologies, combinations thereof, and the like. The communications component 518 can include the NFC hardware component(s) 116.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, the mobility state determination hardware component(s) 124, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540.

Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
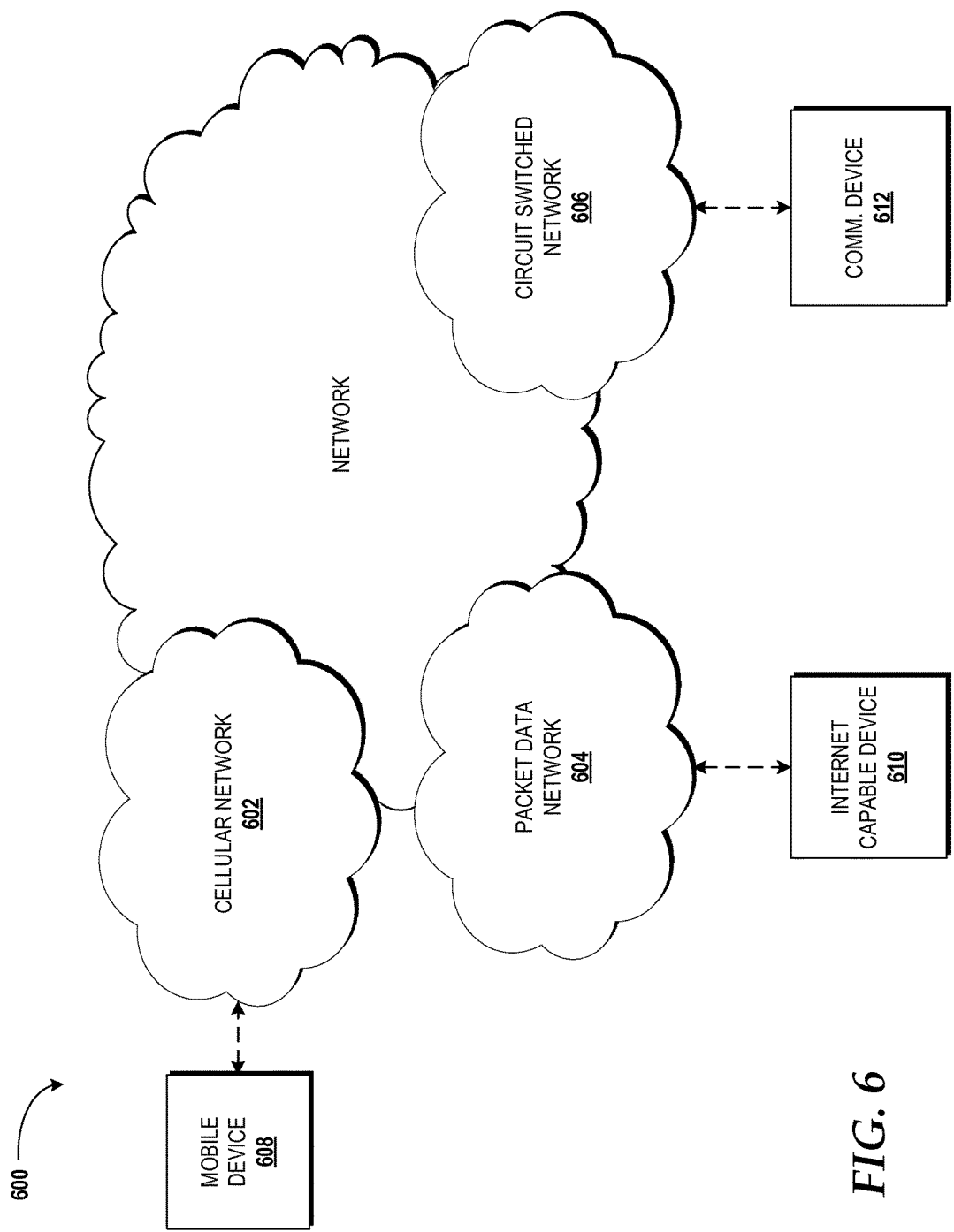
FIG. 6 schematically illustrates a network, according to an illustrative embodiment.

Turning now to FIG. 6, additional details of a network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, BTSs, NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the network 128, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, the mobile initiator device 104, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the mobile initiator device 104, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, the mobile initiator device 104, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to UE NFC gating according to kinetic speed detection and cell visitation history have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
determining, by a mobile initiator device comprising a processor, a physical cell identifier of a camping cell site upon which the mobile initiator device is camping;
determining, by the mobile initiator device, based upon the physical cell identifier, whether at least one passive near-field communication device is available in the camping cell site;
when the at least one passive near-field communication device is available in the camping cell site, activating, by the mobile initiator device, via a near-field communication hardware component of the mobile initiator device, a radio frequency field in accordance with a first radio frequency field duty cycle designed to maximize detection success of the at least one passive near-field communication device;
when no passive near-field communication device is available in the camping cell site
determining, by the mobile initiator device, a mobility state of the mobile initiator device; and
controlling, by the mobile initiator device, based upon the mobility state, activation of the radio frequency field that is used to activate a passive near-field communications device so that activation of the radio frequency field is either in accordance with a second radio frequency field duty cycle designed to maximize battery efficiency of the mobile initiator device or the first radio frequency field duty cycle designed to maximize detection success of any passive near-field communications device.

2. The method of claim 1, wherein:
determining, by the mobile initiator device, the mobility state of the mobile initiator device comprises determining, by the mobile initiator device, the mobility state of the mobile initiator device to be a pedestrian mobility state; and
controlling, by the mobile initiator device, based upon the mobility state, activation of the radio frequency field, via the near-field communications hardware component, that is used to activate the passive near-field communications device comprises controlling, by the mobile initiator device, based upon the pedestrian mobility state, activation of the radio frequency field, via the near-field communications hardware component, that is used to activate the passive near-field communications device so that activation of the radio frequency field is in accordance with the first radio frequency field duty cycle designed to maximize detection success of the passive near-field communications device.

3. The method of claim 1, wherein
determining, by the mobile initiator device, the mobility state of the mobile initiator device comprises determining, by the mobile initiator device, the mobility state of the mobile initiator device to be a vehicular mobility state; and
controlling, by the mobile initiator device, based upon the mobility state, activation of the radio frequency field, via the near-field communications hardware component, that is used to activate the passive near-field communications device comprises controlling, by the mobile initiator device, based upon the vehicular mobility state, activation of the radio frequency field, via the near-field communications hardware component, that is used to activate the passive near-field communications device so that activation of the radio frequency field is in accordance with the first radio frequency field duty cycle designed to maximize battery efficiency of the mobile initiator device.

4. The method of claim 1, wherein:
determining, by the mobile initiator device, the mobility state of the mobile initiator device comprises determining, by the mobile initiator device, the mobility state of the mobile initiator device to be a stationary mobility state; and
controlling, by the mobile initiator device, based upon the mobility state, activation of the radio frequency field, via the near-field communications hardware component, that is used to activate the passive near-field communications device comprises controlling, by the mobile initiator device, based upon the stationary mobility state, activation of the radio frequency field that is used to activate the passive near-field communications device so that activation of the radio frequency field is in accordance with the first radio frequency field duty cycle designed to maximize battery efficiency of the mobile initiator device.

5. The method of claim 1, further comprising:
detecting, by the mobile initiator device, a change from the mobility state to a new mobility state; and
in response to detecting the change from the mobility state to the new mobility state, activating, by the mobile initiator device, the radio frequency field for a specified time.

6. The method of claim 5, further comprising:
receiving, by the mobile initiator device, a response from the passive near-field communications device; and
associating, by the mobile initiator device, the physical cell identifier with the passive near-field communications device in a cell visitation history storage.

7. A mobile initiator device comprising:
a mobility state determination hardware component;
a near-field communications hardware component;
a processor; and
a memory comprising computer-executable instructions that, when executed by the processor, cause the mobile device to perform operations comprising
determining a physical cell identifier of a camping cell site upon which the mobile initiator device is camping,
determining, based upon the physical cell identifier, whether at least one passive near-field communication device is available in the camping cell site,
when the at least one passive near-field communication device is available in the camping cell site, activating, via the near-field communication hardware component, a radio frequency field in accordance with a first radio frequency duty cycle designed to maximize detection success of the at least one passive near-field communication device,
when no passive near-field communication device is available in the camping cell site
determining, via the mobility state determination hardware component, a mobility state of the mobile initiator device, and
controlling, based upon the mobility state, activation of the radio frequency field, via the near-field communications hardware component, that is used to activate at least one passive near-field communications device so that activation of the radio frequency field is either in accordance with a second radio frequency field duty cycle designed to maximize battery efficiency of the mobile initiator device or the first radio frequency field duty cycle designed to maximize detection success of any passive near-field communications device.

8. The mobile initiator device of claim 7, wherein:
determining, via the mobility state determination hardware component, the mobility state of the mobile initiator device comprises determining, via the mobility state determination hardware component, the mobility state of the mobile initiator device to be a pedestrian mobility state; and
controlling, based upon the mobility state, activation of the radio frequency field, via the near-field communications hardware component, that is used to activate the passive near-field communications device comprises controlling, based upon the pedestrian mobility state, activation of the radio frequency field, via the near-field communications hardware component, that is used to activate the passive near-field communications device so that the activation of the radio frequency field is in accordance with the radio frequency field duty cycle designed to maximize detection success of the passive near-field communications device.

9. The mobile initiator device of claim 7, wherein:
determining, via the mobility state determination hardware component, the mobility state of the mobile initiator device comprises determining, via the mobility state determination hardware component, the mobility state of the mobile initiator device to be a vehicular mobility state; and
controlling, based upon the mobility state, activation of the radio frequency field, via the near-field communications hardware component, that is used to activate the passive near-field communications device comprises controlling, based upon the vehicular mobility state, activation of the radio frequency field, via the near-field communications hardware component, that is used to activate the passive near-field communications device so that the activation of the radio frequency field is in accordance with the radio frequency field duty cycle designed to maximize battery efficiency of the mobile initiator device.

10. The mobile initiator device of claim 7, wherein:
determining, via the mobility state determination hardware component, the mobility state of the mobile initiator device comprises determining, via the mobility state determination hardware component, the mobility state of the mobile initiator device to be a stationary mobility state; and
controlling, based upon the mobility state, activation of the radio frequency field, via the near-field communications hardware component, that is used to activate the passive near-field communications device comprises controlling, based upon the stationary mobility state, activation of the radio frequency field that is used to activate the passive near-field communications device so that the activation of the radio frequency field is in accordance with the radio frequency field duty cycle designed to maximize battery efficiency of the mobile initiator device.

11. The mobile initiator device of claim 7, wherein the operations further comprise:
detecting, via the mobility state determination hardware component, a change from the mobility state to a new mobility state; and
in response to detecting the change from the mobility state to the new mobility state, activating, via the near-field communications hardware component, the radio frequency field for a specified time.

12. The mobile initiator device of claim 11, wherein the operations further comprise:
receiving, via the near-field communications hardware component, a response from a passive near-field communications device; and
associating the physical cell identifier with the passive near-field communications device in a cell visitation history storage.

13. A computer-readable storage medium comprising computer-executable instructions that, when executed by a processor of a mobile initiator device, cause the mobile initiator device to perform operations comprising:
determining a physical cell identifier of a camping cell site upon which the mobile initiator device is camping;
determining, based upon the physical cell identifier, whether at least one passive near-field communication device is available in the camping cell site;

when the at least one passive near-field communication device is available in the camping cell site, activating, via the near-field communication hardware component, a radio frequency field in accordance with a first radio frequency duty cycle designed to maximize detection success of the at least one passive near-field communication device;

when no passive near-field communication device is available in the camping cell site determining, via a mobility state determination hardware component of the mobile initiator device, a mobility state of the mobile initiator device; and controlling, based upon the mobility state, activation of the radio frequency field, via a near-field communications hardware component of the mobile initiator device, that is used to activate a passive near-field communications device so that activation of the radio frequency field is either in accordance with a second radio frequency field duty cycle designed to maximize battery efficiency of the mobile initiator device or the first radio frequency field duty cycle designed to maximize detection success of any passive near-field communications device.

14. The computer-readable storage medium of claim 13, wherein:

determining, via the mobility state determination hardware component, the mobility state of the mobile initiator device comprises determining, via the mobility state determination hardware component, the mobility state of the mobile initiator device to be a pedestrian mobility state; and controlling, based upon the mobility state, activation of the radio frequency field, via the near-field communications hardware component, that is used to activate the passive near-field communications device comprises controlling, based upon the pedestrian mobility state, activation of the radio frequency field, via the near-field communications hardware component, that is used to activate the passive near-field communications device so that the activation of the radio frequency field is in accordance with the radio frequency field duty cycle designed to maximize detection success of the passive near-field communications device.

15. The computer-readable storage medium of claim 13, wherein:

determining, via the mobility state determination hardware component, the mobility state of the mobile initiator device comprises determining, via the mobility state determination hardware component, the mobility state of the mobile initiator device to be a vehicular mobility state; and controlling, based upon the mobility state, activation of the radio frequency field, via the near-field communications hardware component, that is used to activate the passive near-field communications device comprises controlling, based upon the vehicular mobility state, activation of the radio frequency field, via the near-field communications hardware component, that is used to activate the passive near-field communications device so that the activation of the radio frequency field is in accordance with the radio frequency field duty cycle designed to maximize battery efficiency of the mobile initiator device.

16. The computer-readable storage medium of claim 13, wherein:

determining, via the mobility state determination hardware component, the mobility state of the mobile initiator device comprises determining, via the mobility state determination hardware component, the mobility state of the mobile initiator device to be a stationary mobility state; and controlling, based upon the mobility state, activation of the radio frequency field, via the near-field communications hardware component, that is used to activate the passive near-field communications device comprises controlling, based upon the stationary mobility state, activation of the radio frequency field that is used to activate the passive near-field communications device so that the activation of the radio frequency field is in accordance with the radio frequency field duty cycle designed to maximize battery efficiency of the mobile initiator device.

17. The computer-readable storage medium of claim 13, wherein the operations further comprise:

detecting, via the mobility state determination hardware component, a change from the mobility state to a new mobility state;

in response to detecting the change from the mobility state to the new mobility state, activating, via the near-field communications hardware component, the radio frequency field for a specified time;

receiving, via the near-field communications hardware component, a response from a passive near-field communications device;

and associating the physical cell identifier with the passive near-field communications device in a cell visitation history storage.

* * * * *